Sept. 1, 1953  F. V. FORSS ET AL  2,650,992
END BELL ASSEMBLY FOR DYNAMOELECTRIC MACHINES
Filed Jan. 10, 1952
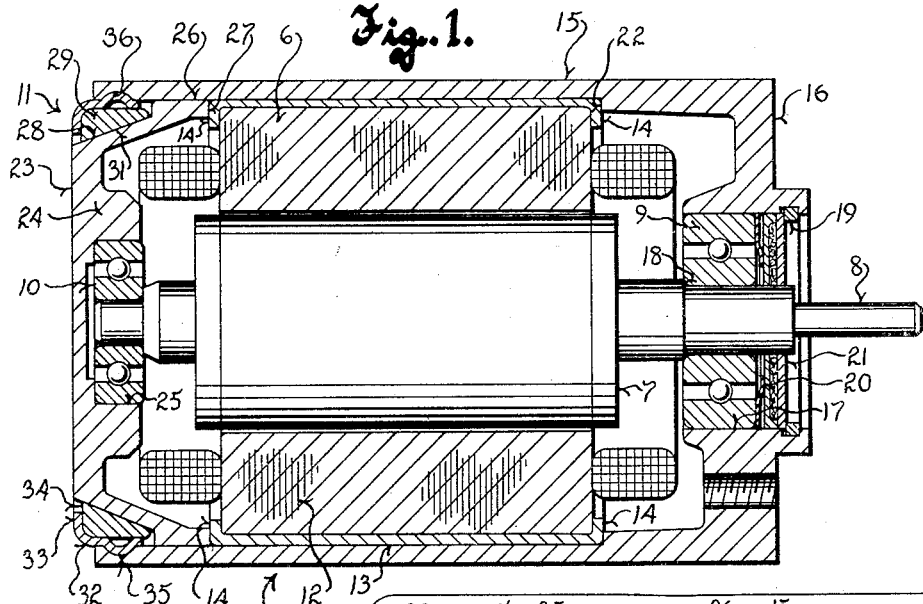
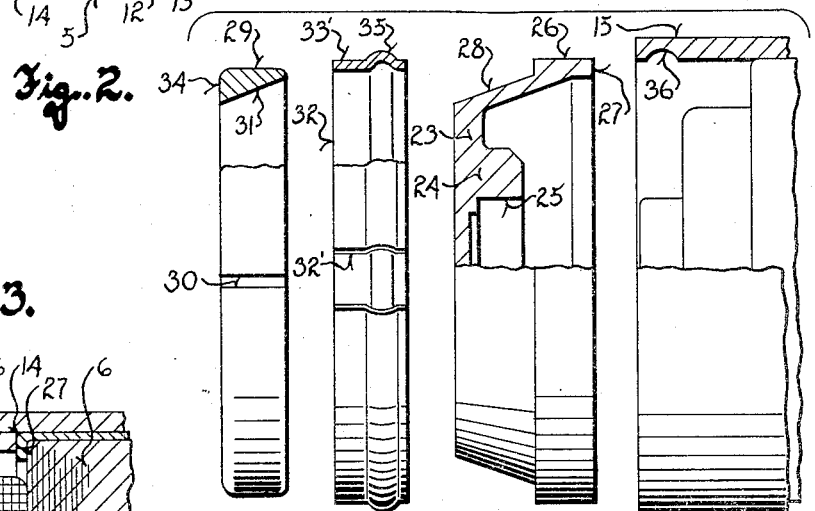
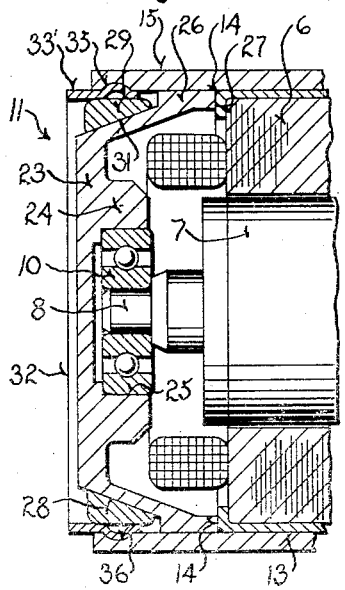
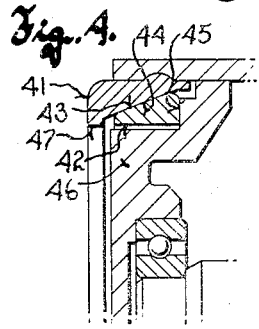
Inventors
Fritz V. Forss
Gene M. Neff
By
Attorney Patented Sept. 1, 1953

2,650,992

UNITED STATES PATENT OFFICE 2,650,992

END BELL ASSEMBLY FOR DYNAMO-
ELECTRIC MACHINES

Fritz V. Forss and Gene M. Neff, Racine, Wis.,
assignors to John Oster Manufacturing Company, Racine, Wis., a corporation of Wisconsin Application January 10, 1952, Serial No. 265,756

5 Claims. (Cl. 310—42)

This invention relates to dynamoelectric machinery and refers more particularly to an assembly for holding an end bell in place on a relatively small electric motor or the like.

In some types of fractional horsepower electric motors and generators, such as those used in aircraft installations, the usual axial throughbolts cannot be employed to secure the end bells to the medial portion of the casing, and because of space requirements it is also often undesirable to employ bolts or the like which extend radially into the end bells. A serious problem arises in such situations, since it is essential that the end bells be securely held to the casing in a manner which will resist both axial and radial displacement, in view of the fact that the end bells carry the rotor bearings, while at the same time it is obviously desirable to be able to remove the rotor and bearings without serious inconvenience to permit inspection and replacement. Obviously, too, considerations of cost, compactness and weight are important factors in the design of any device for holding the end bells in place.

With these several considerations in mind, it is an object of this invention to provide a simple, light and inexpensive assembly for a fractional horsepower electrical machine of the character described whereby an end bell or bearing support can be securely held in place in the casing without the necessity for bolts or screws of any type and which assembly will, nevertheless, permit of easy removal of the end bell so secured to enable access to the rotor and bearings.

Another object of this invention resides in the provision of an assembly of the character described wherein the radial force, either contractive or expansive, stored in a split spring ring is translated into axial inward thrust upon an end bell in the motor casing to thereby wedge the end bell axially inwardly into firm engagement with a fixed part in the casing.

Still another object of this invention resides in the provision of an assembly of the character described wherein a simple locking ring will receive the camming reaction in one axial direction of a wedge-like radially biased clamping ring, while the reaction of the clamping ring in the opposite axial direction is exerted upon the end bell to securely retain the same in position.

With the above and other objects in view, which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawing illustrates two complete examples of the physical embodiments of the invention constructed according to the best modes so far devised for the practical application of the principles thereof, and in which:

Figure 1 is a longitudinal sectional view through a motor having the end bell assembly of this invention;

Figure 2 is a group side elevational view of the components of the assembly of this invention shown partly cut away;

Figure 3 is a view similar to Figure 1 but showing only one end portion of the motor, immediately prior to the last step in the assembly process; and Figure 4 is a fragmentary sectional view of a modified embodiment of the assembly of this invention.

Referring now more particularly to the accompanying drawing, in which like numerals designate like parts throughout the several views, the numeral 5 designates generally an electrical machine, in this instance a fractional horsepower alternating current motor, having a wound stator 6 and a squirrel cage rotor 7, the shaft 8 of which is journaled in bearings 9 and 10 mounted at the front and rear of the motor, respectively. It should be noted that the terms "front" and "rear" are herein used arbitrarily, and that the end bell assembly of this invention, designated generally by 11, will be considered as being at the rear of the motor, although it can equally well be employed at the front or at both ends of the motor.

The stator core laminations 12 are held assembled by means of a thin tubular shell 13, the end portions of which are rolled inwardly around the ends of the stator laminae, as at 14, to provide annular flanges which prevent relative axial displacement of the stator laminae. Surrounding the stator is a casing 15 which is substantially tubular or cylindrical, but the front end portion 16 of which is formed as an integral end bell in which the front rotor bearing 9 is seated. Because of the nature of the end bell assembly of this invention, this casing may be made either as light in weight as desired or as heavy and rigid as necessary, and may be formed of metal or molded of plastic.

The front bearing 9 is received in a bore 17 in the integral front end bell, and inward axial displacement of the front rotor bearing is precluded by its engagement with a forwardly facing shoulder 18 on the rotor shaft, defined by a reduced diameter portion at the front of the shaft, while the bearing is restrained against outward axial displacement by a conventional locking ring 19 seated in a circumferential groove in the bearing bore 17. Interposed between the locking ring and the bearing are a flexible, cup-like spring washer 20 and a sealing washer assembly 21. The sealing washer, of course, prevents bearing lubricant from oozing out of the motor housing, while the spring washer 20 prevents end play of the motor shaft.

If desired, the bore 17 may have a diameter slightly larger than that of the rotor so that the rotor as well as the front bearing can be removed for inspection by merely removing the locking ring 19 and withdrawing the rotor shaft.

The casing 15 also has an integral rearwardly facing shoulder 22 against which the front flange 14 of the stator shell abuts to preclude axial forward displacement of the stator.

Both the stator and the rotor are constrained against axial rearward displacement by the assembly of this invention now about to be described.

The rear end portion of the casing is tubular, and extends a substantial distance behind the stator. The rear end bell 23 is a separate member which fits inside the rear end portion of the casing. It has a hub-like central bearing seat portion 24 with a forwardly opening well 25 therein in which the rear rotor bearing 10 is seated, and a coaxial outer portion 26 with a diameter substantially equal to the inside diameter of the rear portion of the casing. The front surface 27 of this coaxial outer portion provides a shoulder which engages the rear flange 14 on the stator shell, so that as the end bell is forced axially inwardly by the assembly about to be described, the stator is clamped between the end bell and the shoulder 22 in the casing, and at the same time the stator provides a stop or abutment against which the end bell is forced.

The coaxial outer portion of the end bell is disposed axially inwardly of the central bearing seat portion 24 and the bearing seat portion has an external frusto-conical surface 28 which tapers rearwardly. Upon this hub-like frusto-conical portion a clamping ring 29 is seated. The clamping ring is made of flexible metal and has a gap or transverse split 30 at one point in its circumference to enable it to be radially expanded or contracted. The clamping ring is wedge-shaped in cross section, its inner surface 31 being tapered to correspond to the taper of the frusto-conical hub portion of the end bell, and the ring is seated on said hub portion in radially expanded condition so that the ring tends to contract about the hub portion to effect camming engagement between its tapering surface and that of the hub portion, which camming tends to move the clamping ring rearwardly relative to the end bell.

Rearward axial movement of the clamping ring is precluded, however, by a locking ring 32 which is fixed with respect to the casing 15 and which, when completely assembled, has a radially inwardly turned annular flange 33 against which the rear surface 34 of the clamping ring engages. Thus the locking ring provides in effect a reaction member against which the camming reaction of the clamping ring is exerted in one axial direction, namely rearwardly, to bring about an equal and forward reaction upon the hub portion of the end bell, to thereby clamp the end bell into firm engagement with the rear of the stator.

The locking ring may be made as a stamped or rolled part of relatively thin sheet metal and is initially formed as a substantially cylindrical ring (as shown in Figures 2 and 3) having a gap or transverse split 32' at one point in its circumference, to enable it to be radially deformed, and having a circumferential rib or land 35 which engages in a circumferential groove 36 in the inner surface of the casing near the rear end thereof. The locations of the land on the locking ring and the groove in the casing are so related that the rear end portion 33' of the locking ring protrudes from the rear of the casing when the locking ring is first installed therein, and this protruding portion is turned in, as the last step in the assembly operation, to form the flange 33.

In assembling a motor having the end bell securement of this invention, the stator is slipped into place from the rear of the casing, the rotor and front end bearing are inserted, and the rear end bell, with the rear bearing 9 in the bearing seat, is slipped into the rear of the casing. The locking ring is then radially contracted to enable the land or rib 35 thereon to clear the rear end of the casing and it is slipped into place. Next the clamping ring is pushed into place and forward pressure is applied to it so as to expand it radially and impart an initial bias to it, and also to wedge it against the locking ring to firmly seat the locking ring land 35 in the groove 36 in the casing. While forward pressure is being applied to the clamping ring, the projecting rear edge portion 33' of the locking ring is folded or rolled over as shown in Figure 1 to form the annular flange 33. This can be done by means of a spinning operation or by means of a mechanical or hydraulic press or can be accomplished by hand.

After completion of the ledge forming operation, forward thrust upon the locking ring will, of course, be relaxed and were it not for the clamping ring there might then be end play between the parts in the casing. However, as already explained, the clamping ring is radially biased into camming engagement with the frusto-conical surface on the end bell so that the force stored in the clamping ring is translated into a rearward force which the ring exerts against the flange on the locking ring and a reaction of the end bell which tends to move the end bell forwardly so that all of the nonrotating parts inside the motor casing are clamped into secure engagement with one another to preclude any possibility of axial play.

In the embodiment of the invention shown in Figure 4 the cooperating cam surfaces which translate radial bias of the clamping ring into axial forces are formed on the inner surface of the locking ring and the outer surface of the clamping ring, respectively, so that the locking ring 41 must be formed as a screw machine part or the like, rather than as a stamping. In this embodiment the clamping ring 42 has a frusto-conical outer surface 43 which tapers rearwardly, and the inner surface 44 of the locking ring is tapered correspondingly. The clamping ring, moreover, is radially contracted (rather than expanded) upon installation and these tapered surfaces on the clamping ring and locking ring are thus biased into camming engagement with one another so that the force stored in the clamping ring is translated into an axial force which tends to move it forwardly.

In this embodiment the hub-like central portion of the end bell need not be provided with a frusto-conical outer surface but has a rearwardly facing shoulder 45 against which the front surface of the clamping rings abuts to enable the forward force of the clamping ring to be imparted to the end bell.

In assembling the components of this modified embodiment of the invention the two rings are telescoped together and they are radially contracted to enable them to be inserted simultaneously into the rear of the casing. It will of course be understood that each of the two rings of the modified embodiment has a gap or transverse split at one point in its circumference, like the rings of the first described embodiment. To facilitate insertion of the rings while they are radially contracted the diameter of the hub portion 46 of the end bell is somewhat smaller than the normal diameter of the clamping ring, thus allowing for contraction of the clamping ring, and a small ledge or inwardly turned annular flange 47 at the rear of the locking ring precludes axial rearward displacement of the clamping ring with respect to the locking ring during assembly.

The modified embodiment of the invention just described is advantageous in that it eliminates the necessity for rolling or bending the projecting rear edge portion of the locking ring and enables disassembly of the rear end bell without the necessity for destroying and replacing the locking ring, as in the case of the first described embodiment; but it has the disadvantage of requiring a slightly more expensive locking ring than that of the Figure 1 embodiment.

From the foregoing description, taken together with the accompanying drawings, it will be apparent that this invention provides a simple, compact, efficient and inexpensive assembly for holding an end bell in place in a dynamo-electric machine without the necessity for using either radially or axially inserted bolts, rivets or similar devices.

What we claim as our invention is:

1. In an electrical machine having a stator and a rotor journaled in bearings: a casing surrounding the stator and having a tubular end portion extending beyond one end of the stator; a bearing support having a radially outer portion comprising shoulders engaged with parts in said casing to restrain the bearing support against radial and axially inward displacement, and an axially outer hub-like bearing seat portion having an axially outwardly tapering frusto-conical surface; a split locking ring in said end portion of the casing having an annular flange extending radially inwardly; cooperating abutments on said locking ring and in the casing to preclude axial outward displacement of said locking ring; and a radially expansible split clamping ring having a frusto-conical inner surface substantially corresponding to said frusto-conical surface on the bearing support and radially expanded into camming engagement with said hub-like bearing seat surface, said clamping ring having an axially outer surface engaging said flange on the locking ring so that the contractive force of the clamping ring causes it to react against the locking ring and against said frusto-conical surface on the bearing support to thereby wedge the bearing support axially inwardly.

2. In an electrical machine having a stator and a rotor journaled in bearings: a casing member surrounding the stator and having a tubular end portion extending beyond one end of the stator; an end bell member in said end of the casing having shoulders engaged with parts in said casing member to restrain the end bell member against radial and axially inward displacement; a hub-like bearing seat portion on said end bell member; cooperating radially opposite surfaces, one on each of said members, defining an annular slot, said surface on one of said members being frusto-conical and tapering axially outwardly; a split, flexible clamping ring encircling said hub-like portion and having a wedge shaped cross-section with a frusto-conical surface substantially corresponding to that on said one member, said clamping ring being held tensioned radially with its frusto-conical surface in camming engagement with the frusto-conical surface on said one member so that radial tension of the clamping ring is translated into axial force tending to move the clamping ring in one axial direction and the member having the frusto-conical surface in the opposite axial direction; and an abutment on the other member against which the clamping ring reacts in consequence of its tendency to move in said one direction so that said clamping ring, by reacting between said two members, urges the end bell member axially inwardly.

3. In an electrical machine having a stator and a rotor journaled in bearings: a casing surrounding the stator and having a substantially tubular end portion extending beyond one end of the stator; an end ball in said end portion of the casing having a central bearing seat portion and an axially inner portion engaging parts in the casing to preclude radial and axially inward displacement of the end bell; an axially outer hub-like member on said end bell; a split clamping ring encircling the periphery of said hub-like member; an annular member on the casing encircling the clamping ring; cooperating cam surfaces on the clamping ring and one of said members, holding the clamping ring tensioned radially in a direction to maintain said cam surfaces in engagement by the force stored in the clamping ring, one of said cam surfaces being frusto-conical and converging axially outwardly, and the other cooperating therewith to urge the clamping ring and said one member axially in opposite directions in consequence of the radial force stored in the clamping ring; and cooperating abutments on the clamping ring and the other of said members for receiving the force of the clamping ring in the axial direction in which it is cammed to preclude motion of the clamping ring in said axial direction so that the clamping ring reacts between said abutment and said surface on the one member by which the ring is held tensioned to wedge the end bell axially inwardly.

4. In an electrical machine having a stator and a rotor journaled in bearings: a casing member surrounding the stator and having a tubular end portion extending beyond one end of the stator; an end bell member in said end of the casing member and having shoulders engaged with parts in said casing member to restrain the end bell member against radial and axially inward displacement; an axially outer hub-like bearing seat portion on said end bell member; a split, flexible clamping ring encircling said hub-like portion on the end bell member and having a wedge shaped cross section, one surface of said clamping ring being frusto-conical and converging axially outwardly; cooperating radially opposite surfaces on said members defining an annular slot, one of said surfaces engaging the frusto-conical surface of the clamping ring and holding it tensioned radially and cooperating with said frusto-conical surface to translate radial tension of the clamping ring into axial force tending to move the clamping ring in one axial direction; and an abutment on the other member against which the thicker axial end of the clamping ring abuts in consequence of its tendency to move in said one direction so that said clamping ring, by reacting between said two members, urges the end bell member axially inwardly.

5. In an electrical machine having a stator and a rotor journaled in bearings: a casing member surrounding the stator and having a tubular end portion extending beyond one end of the stator; an end bell member in said end of the casing member and having shoulders engaged with parts in said casing member to restrain the end bell member against radial and axially inward displacement; a hub-like bearing seat portion on said end bell member; cooperating radially opposite surfaces, one on each of said members defining an annular slot, one of said surfaces being frusto-conical and tapering axially outwardly; a split, flexible clamping ring encircling said hub-like portion of the end bell member and held tensioned radially in camming engagement with said frusto-conical surface so that radial tension of the clamping ring is translated into axial force tending to move the clamping ring in one axial direction and the member having the frusto-conical surface in the opposite axial direction; and an abutment on the other member against which the clamping ring reacts in consequence of its tendency to move in said one direction so that said clamping ring, by reacting between said two members, urges the end bell member axially inwardly.

FRITZ V. FORSS.
GENE M. NEFF.

References Cited in the file of this patent
UNITED STATES PATENTS

| Number | Name | Date |
|---|---|---|
| 2,332,458 | Muney et al. | Oct. 19, 1943 |
| 2,411,634 | Hamilton et al. | Nov. 26, 1946 |
| 2,568,124 | Gravel | Sept. 18, 1951 |
| 2,595,349 | Fox | May 6, 1952 |

FOREIGN PATENTS

| Number | Country | Date |
|---|---|---|
| 367,285 | Great Britain | Feb. 18, 1932 |